SUPERREGENERATIVE OSCILLATING DETECTOR CIRCUIT

Filed April 24, 1963

INVENTOR.
Adrianus Korpel
BY Francis W. Crotty
Atty.

3,296,537
SUPERREGENERATIVE OSCILLATING DETECTOR CIRCUIT

Adrianus Korpel, Prospect Heights, Ill., assignor to Zenith Radio Corporation, Chicago, Ill., a corporation of Delaware Filed Apr. 24, 1963, Ser. No. 275,328
2 Claims. (Cl. 328—140)

The present invention is directed to a wave-signal energy responsive device and more particularly to a wave-signal receiver that may be advantageously employed in a remote control system.

Remote control systems responding to radio frequency or ultrasonic wave signals are, of course, well known in the art, one of their most common uses being for the control of television receivers. It is usually necessary in these types of control devices to utilize a unique frequency for each control function desired to be accomplished because frequency selectivity facilitates separation of the various control signals to be received. A multi-frequency control receiver is a complex electronic device in that it must contain those circuit components which permit distinguishing between signal frequencies. Another characteristic of such a remote control receiver is its requirement of high sensitivity and, yet, immunity to noise.

It is an object of this invention to provide an improved wave-signal energy responsive device that may serve, for example, as a remote control receiver.

It is another object of this invention to provide a wave-signal receiver for a remote control system which responds to a plurality of control frequencies but yet is simple and economical in construction.

In accordance with the above objects, a wave-signal energy responsive device embodying the invention comprises a superregenerative oscillating detector having a predetermined quench frequency. A first resonant network is included in the detector and is responsive to thermal agitation noise to cause the build-up of oscillations in the detector toward a saturation level at a first predetermined rate. A second resonant network is included in the detector and has a resonant frequency different from that of the first network. The second network has an oscillation build-up rate less than that of the first resonant network and is effective in the presence of an applied signal corresponding in frequency to the resonant frequency of the second network and exceeding a predetermined threshold level to cause oscillations at the frequency of the applied signal to predominate in the detector. An input circuit applies to the detector a received signal corresponding in frequency to the resonant frequency of the second network. Means responsive only to the predominance of oscillations in the detector at the signal frequency accomplish a control function.

Figure 1:
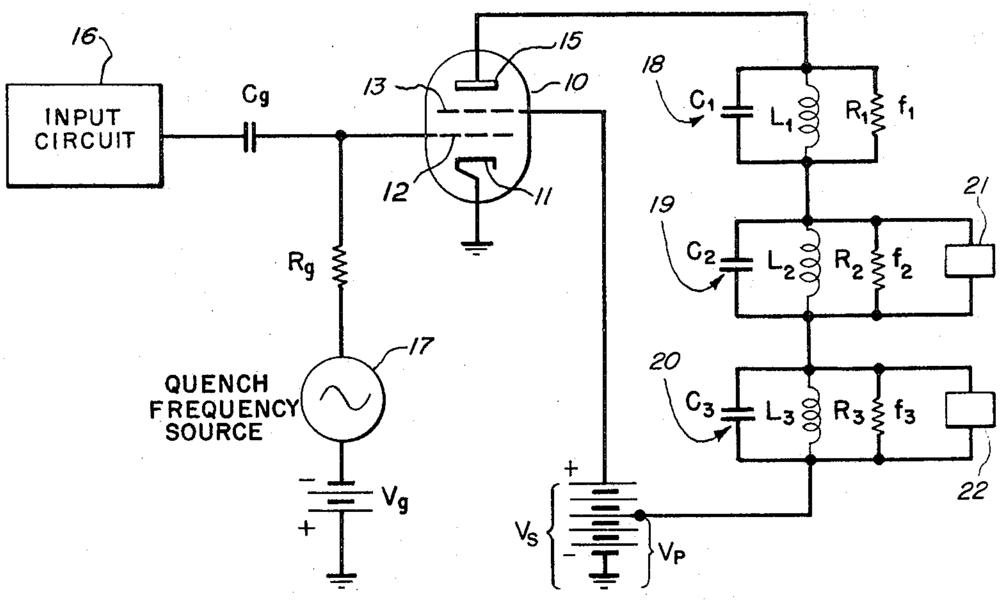
Figure 2:
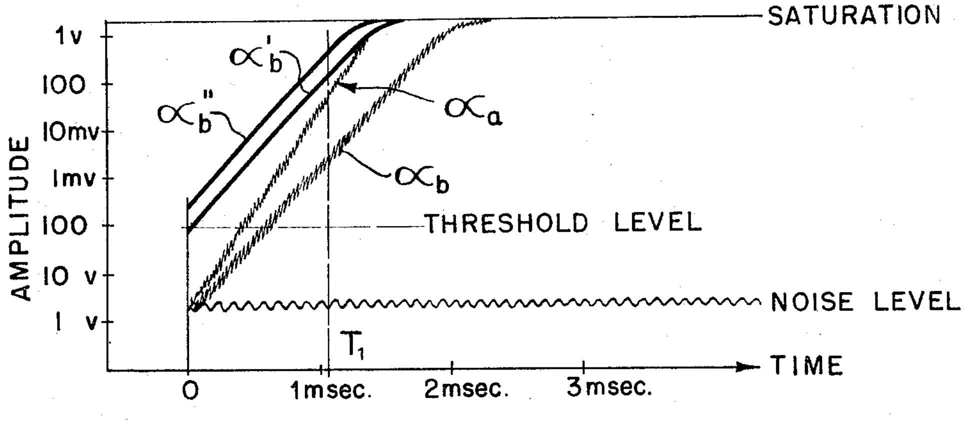

The features of the present invention which are believed to be novel are set forth with particularity in the appended claims. The invention, together with further objects and advantages thereof, may best be understood by reference to the following description taken in connection with the accompanying drawing in which:

FIGURE 1 is a schematic diagram of a circuit embodying the present invention; and FIGURE 2 is a graph which illustrates the principle of operation of the invention.

Referring now to FIGURE 1 the receiver circuit there illustrated includes a dynatron oscillator which is connected to function as a logarithmic-mode superregenerative oscillator having a predetermined quench frequency. The core of the oscillator is a tetrode vacuum tube 10 having a grounded cathode 11, a control grid 12, a screen grid 13 and a plate 15. Tube 10 is connected as a potential dynatron oscillator by the application of operating potentials such that the plate voltage is less than the screen voltage. More specifically, screen 13 is connected to the positive terminal of a unidirectional screen voltage source $V_s$ which is grounded at its negative terminal. The plate voltage $V_p$, which is less than the screen voltage, is obtained from a tap on the screen voltage source. With the above-described connection, the slope of the plate current versus plate voltage characteristic is negative over a predetermined range of plate voltages and thus the dynatron exhibits a negative A.C. conductance in a manner well understood in the art. When shunted by a parallel resonant circuit having an equivalent loss conductance which is smaller than the absolute magnitude of the negative conductance provided by tube 10, oscillations at the resonant frequency start up and increase in amplitude, until limited by the curvature of the tube characteristic or by some other form of amplitude control, to a saturation level. Thereafter, the oscillations are caused to decay by a quenching potential developed within the oscillator or supplied from an external source. In superregenerative operation, the build-up and decay of oscillations occur at a rate corresponding to the quench frequency. For the case under consideration, external quenching is employed as described hereafter.

The oscillating detector includes a plurality of resonant networks which influence the frequency of oscillations. More particularly, first network means 18 are coupled to plate 15 of tube 10 and include parallel connected resistance $R_1$, inductance $L_1$, and capacitance $C_1$, which resonate at a first predetermined frequency $f_1$. Network 18 has a first predetermined rate of oscillation build-up which is designated as the "$\alpha$" of the circuit. For a parallel circuit arrangement of the type shown for network 18, "$\alpha$" is equal to the algebraic sum of the negative conductance of the dynatron, the positive conductance of network 18, and other resistive losses in the circuit divided by twice the capacitance of the network. The oscillation build-up rate of network 18 is illustrated in FIGURE 2 by the curve labeled $\alpha_a$. The abscissa of the graph denotes time and the ordinate the amplitude of the oscillation voltage plotted on a logarithmic scale in order to illustrate the exponential build-up curves as straight lines. The scale values are merely for convenience in interpreting the curves.

Second and third network means 19 and 20 are series connected with network 18 to plate 15 and are resonant at frequencies $f_2$ and $f_3$. These networks are also of the parallel RLC type and have identical oscillation build-up rates as indicated in FIGURE 2 by the curve $\alpha_b$. As apparent from the graph, their oscillation build-up rate is less than that of network 18 and the significance of this will be explained below.

Networks 18, 19 and 20 present a low impedance for all frequencies except their respective resonant frequencies. Utilization devices 21 and 22 which are connected across networks 19 and 20 are thus supplied a significant signal voltage only during resonant conditions of the respective networks. The utilization devices may be, for example, relays and in a remote control system for a television receiver, device 21 may control on-off and volume and device 22 tuning.

An input circuit 16 applies signals of frequencies $f_2$ and $f_3$ to grid 12 of tube 10 through an input coupling capacitance $C_g$. In the case of a remote control system of the type described in Patent 2,817,025 granted to Robert Adler and assigned to the present assignee, input circuit 16 includes a microphone receptive to ultrasonic signals. In other applications the wave-signal energy responsive device may be a component part of a computer circuit and be utilized to distinguish between two or more signal frequencies.

A quench signal source 17 of the desired frequency is connected to grid 12 through a grid resistor $R_g$. A negative bias source $V_g$ having its positive terminal grounded is also connected to grid 12 through source 17 and grid resistor $R_g$.

Other types of oscillators such as a tunnel diode which also has a negative conductance characteristic may be used in place of the dynatron. Also a transistor or triode may be easily equipped to operate as a two terminal oscillation device.

*Operation*

The superregenerative oscillator of FIGURE 1 is an essentially monostable device which oscillates at its idling frequency $f_1$ in the absence of a signal voltage from input circuit 16 greater than a predetermined threshold level. Oscillations that build-up during each cycle of quench voltage from source 17 start with an initial amplitude determined by noise voltage of the frequency $f_1$ which exists in the circuit and reach a maximum oscillation level corresponding to the equilibrium value for the oscillator as illustrated by curve $\alpha_a$ in FIGURE 2. These oscillations then die out as the quench voltage goes negative. This process repeats at the quench frequency in the absence of an input signal and results in bursts of oscillations in the plate circuit of tube 10. However, the frequency of such oscillations does not correspond to the resonant frequency of either network 19 or network 20 and, therefore, insufficient voltage is developed therein to actuation relays 21 or 22.

If a signal voltage of the frequency $f_2$ or $f_3$ is superimposed upon the system and is large compared to the thermal agitation noise, oscillation build-up starts at an initial amplitude which corresponds to the amplitude of the superimposed signal rather than the smaller amplitude of the noise voltages in the circuit. Saturation level is reached earlier and the frequency of oscillations corresponds to that of the applied signal, permitting selective actuation of relays 21 and 22.

More particularly, in order to achieve discrimination between idling frequency $f_1$ and signal frequencies $f_2$ and $f_3$, the oscillation build-up rates at the latter two frequencies must be lower than the oscillation build-up rate at the idling frequency. If this were not the case and the build-up rates were identical, during quiescent intervals, noise voltages would produce oscillations at any of the three frequencies in random manner thus causing unwanted actuation of utilization devices 21 and 22. However, the use of a lower build-up rate for networks 19 and 20 insures that in the absence of an input signal greater than a predetermined threshold level, oscillations always occurr at idling frequency $f_1$.

The curve $\alpha_b'$ in FIGURE 2 illustrates the build-up of signal voltage in networks 19 or 20 in the presence of a received signal corresponding to the resonant frequency of one of these networks and having a magnitude equal to the threshold level. Curve $\alpha_b'$ has a slope identical, of course, to the slope of curve $\alpha_b$ and is shown as starting at the threshold level but reaching the saturation level at the same time as curve $\alpha_a$. Since the curve which reaches maximum oscillation level first in time determines the frequency of oscillation, from a probability standpoint the circuit will oscillate at the idling frequency 50% of the time and at the signal frequency 50% of the time. A probability of this nature cannot be tolerated in a control circuit and therefore the input signal voltage must have a magnitude slightly greater than the threshold level, as illustrated by curve $\alpha_b''$, to insure oscillation at the signal voltage.

As apparent from the relationship between curves $\alpha_a$ and $\alpha_b$, the threshold level is determined by the difference in their respective oscillation build-up rates. The more dissimilar the rates, the greater the threshold level since the oscillation build-up represented by the curve of lesser slope must start from a higher initial point to win the race to the maximum oscillation level. If the rates are made more similar, the threshold required is reduced but with an attendant reduction in noise immunity. From the above discussion it also is clear that the oscillation build-up rates of networks 19 and 20 need not be identical; it is only necessary that they be less than the build-up rate of idling frequency network 18.

Utilization devices 21 and 22 are necessarily responsive to control signals of the momentary type; that is, a voltage across network 19 or 20 continues at most for a time period equal to the duration of the input signal. Cessation of an input signal causes the oscillator circuit immediately to revert to its idling frequency at the end of a quench cycle.

As described above, the superregenerative detector is operated in a logarithmic mode in which oscillations build-up to a saturation level in each quench cycle. Thus one of the three freqencies $f_1$, $f_2$ and $f_3$ will predominate over the other to determine the final oscillating frequency of the detector. The detector may also be operated in a non-saturated or linear mode by providing a quench signal which quenches the oscillation build-up at some time before saturation is reached. In this situation the detector may have two or three frequencies building up at the same time, one having a higher amplitude than the others and therefore predominating over the other frequencies. This is illustrated in FIGURE 2 where the idling frequency $f_1$, represented by the curve $\alpha_a$, builds up at the same time as signal frequency represented by curve $\alpha_b'$. If the quency frequency is regulated to quench the superregenerative detector at some time $T_1$ before saturation, as illustrated in FIGURE 2, a signal frequency which started a build-up at some predetermined initial threshold level higher than the noise level will have a higher amplitude than the idling frequency at time $T_1$. This initial threshold level is determined, as in the case of logarithmic mode operation, by the difference in build-up rates; in any case, however, it will be lower in linear mode operation as is apparent from the curves of FIGURE 2. By detecting the predominate amplitude of the signal frequency, a control function can be accomplished such as actuating relays 21 or 22 in the same manner as described in conjunction with the detector of FIGURE 1.

Thus, the invention provides a wave-signal energy responsive device which is of high sensitivity since it operates in a superregenerative mode. Moreover, the device is relatively immune to actuation by noise either internal or external since its monostable idling frequency can only be overcome with signals of a predetermined frequency and threshold level. Finally, since only a single electron tube is utilized, the device is simple and economical in construction.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A wave-signal energy responsive device comprising:

a superregenerative oscillating detector having a predetermined quench frequency;

a first resonant network included in said detector responsive to thermal agitation noise to cause the build-up of oscillations in said detector toward a saturation level at a first predetermined rate;

a second resonant network included in said detector, having a resonant frequency different from that of said first network, having an oscillation build-up rate less than that of said first resonant network, and effective in the presence of an applied signal corresponding in frequency to the resonant frequency of said second network and exceeding a predetermined threshold level to cause oscillations at the frequency of said applied signal to predominate in said detector;

an input circuit for applying to said detector a received signal corresponding in frequency to the resonant frequency of said second network;

and means responsive only to the predominance of oscillations in said detector at said signal frequency to accomplish a control function.

2. A wave-signal energy responsive device comprising:

a saturation-mode superregenerative oscillating detector having a predetermined quench frequency;

a first resonant network included in said detector responsive to thermal agitation noise to cause the build-up of oscillations in said detector to a saturation level at a first predetermined rate;

a second resonant network included in said detector, having a resonant frequency different from that of said first network, having an oscillation build-up rate less than that of said first resonant network, and effective in the presence of an applied signal corresponding in frequency to the resonant frequency of said second network and exceeding a predetermined threshold level to determine the oscillating frequency of said detector;

and an input circuit for applying to said detector a received signal corresponding in frequency to the resonant frequency of said second network.

References Cited by the Examiner

UNITED STATES PATENTS

| | | | |
|---|---|---|---|
| 2,931,956 | 4/1960 | Van Arsdale | 317—149 |
| 3,072,887 | 1/1963 | Adler | 340—171 |
| 3,133,252 | 5/1964 | Skolnick et al. | 317—147 X |
| 3,135,921 | 6/1964 | Lenk | 325—429 |

ARTHUR GAUSS, *Primary Examiner.*

J. JORDAN, *Assistant Examiner.*